United States Patent [19]

Schilke et al.

[11] 4,370,789
[45] Feb. 1, 1983

[54] FABRICATION OF GAS TURBINE WATER-COOLED COMPOSITE NOZZLE AND BUCKET HARDWARE EMPLOYING PLASMA SPRAY PROCESS

[76] Inventors: Peter W. Schilke, 4 Hempshire Ct., Scotia, N.Y. 12302; Myron C. Muth, R.D. #3, Western Ave., Amsterdam, N.Y. 12010; William F. Schilling, 301 Garnsey Rd., Rexford, N.Y. 12148; John R. Rairden, III, 6 Coronet Ct., Schenectady, N.Y. 12309

[21] Appl. No.: 246,068

[22] Filed: Mar. 20, 1981

[51] Int. Cl.³ .............................................. B21K 3/04
[52] U.S. Cl. .......................... 29/156.8 H; 416/241 R; 427/34
[58] Field of Search ...................... 427/34; 219/121 P; 29/156.8 B, 156.8 H, 421 R; 416/241 R; 415/12, 212 R, 217 A, 213 R, 148, 216

[56] References Cited

U.S. PATENT DOCUMENTS

| 3,607,381 | 9/1971 | Fairbairn | 117/212 |
|---|---|---|---|
| 3,642,519 | 2/1972 | Tiner et al. | 117/93.1 |
| 3,671,207 | 6/1972 | Lynch et al. | 29/196.6 |
| 3,758,233 | 9/1973 | Cross et al. | 415/212 X |
| 3,839,618 | 10/1974 | Muehlberger | 219/121 P |
| 3,892,882 | 7/1975 | Guest et al. | 427/34 |
| 4,050,133 | 9/1977 | Cretella et al. | 427/34 X |
| 4,075,392 | 2/1978 | Jaeger | 428/457 |
| 4,137,619 | 2/1979 | Beltran et al. | 29/156.8 H |
| 4,145,481 | 3/1979 | Gupta et al. | 428/678 |
| 4,152,223 | 5/1979 | Wallace et al. | 204/37 R |
| 4,155,152 | 5/1979 | Cretella et al. | 29/156.8 B |

OTHER PUBLICATIONS

Mash et al., "Structure and Properties of Plasma–Cast Materials", Metals Engineering Quarterly, Feb. 1964, pp. 18–26.

Primary Examiner—Thurman K. Page

[57] ABSTRACT

In the method for fabrication of water-cooled composite nozzle and bucket hardware for high temperature gas turbines, a high thermal conductivity copper alloy is applied, employing a high velocity/low pressure (HV/LP) plasma arc spraying process, to an assembly comprising a structural framework of copper alloy or a nickel-based super alloy, or combination of the two, and overlying cooling tubes. The copper alloy is plamsa sprayed to a coating thickness sufficient to completely cover the cooling tubes, and to allow for machining back of the copper alloy to create a smooth surface having a thickness of from 0.010 inch (0.254 mm) to 0.150 inch (3.18 mm) or more. The layer of copper applied by the plasma spraying has no continuous porosity, and advantageously may readily be employed to sustain a pressure differential during hot isostatic pressing (HIP) bonding of the overall structure to enhance bonding by solid state diffusion between the component parts of the structure.

4 Claims, 3 Drawing Figures

FABRICATION OF GAS TURBINE WATER-COOLED COMPOSITE NOZZLE AND BUCKET HARDWARE EMPLOYING PLASMA SPRAY PROCESS

BACKGROUND OF THE INVENTION

The invention disclosed herein was made in the course of, or under, a contract with the United States Department of Energy.

The present invention relates to the fabrication of various airfoil-shaped elements employed in gas turbines, particularly stationary gas turbines operating at high temperatures.

Gas turbines require various high strength, precisely shaped airfoil structural elements capable of sustained operation at high gas temperatures. In order to withstand the high gas temperatures and resultant thermal strains involved over a period of time, the structures must be cooled by means of embedded cooling tubes through which a suitable coolant, such as water, circulates.

These elements include stationary airfoil-shaped vanes for directing the flow of hot gases, these stationary vanes being known in the art of stationary gas turbines as "nozzles". An additional type of element is an airfoil-shaped blade which is part of and functions to impart motion to a rotating structure as hot gas is directed into the blade by the vane or nozzle. Such turbine blades are known as "buckets" in the stationary gas turbine art.

These structural elements are conventionally fabricated by means of relatively expensive and complex machining operations by which a number of precision parts such as structural spars, coolant tubes, and skin material are fabricated by precision machining, fitted together, welded, and subsequently diffusion bonded by hot isostatic pressing. U.S. Pat. No. 4,137,619 to Beltran et al. and commonly assigned U.S. patent application Ser. No. 106,681, filed Dec. 26, 1979 by Muth et al. entitled "METHOD OF FABRICATING COMPOSITE NOZZLES FOR WATER COOLED GAS TURBINES", now U.S. Pat. No. 4,283,822, describe methods for fabricating composite gas turbine components.

The present invention provides an alternative method for fabricating water cooled composite nozzle and bucket hardware which provides highly suitable hardware without involving extensive machining operations.

SUMMARY OF THE INVENTION

It is an object of the invention to provide a method for fabrication of water-cooled composite nozzle and bucket hardware for gas turbines.

Briefly stated, and in accordance with an overall concept of the invention, a high thermal conductivity copper alloy such as oxide dispersion strenghtened copper (Glidden AL-60) is applied, employing a high velocity/low pressure (HV/LP) plasma arc spraying process, to an assembly comprising a structural framework of copper alloy or a nickel-based superalloy, or combination of the two, and overlying cooling tubes. The copper alloy is plasma sprayed to a coating thickness sufficient to completely cover the cooling tubes, and to allow for machining back of the copper alloy to create a smooth surface having a thickness of from 0.010 inch to 0.150 inch (0.254 to 3.81 mm) or more.

Since the layer of copper applied by the plasma spraying has no continuous porosity, it advantageously may readily be employed to sustain a pressure differential during hot isostatic pressing (HIP) bonding of the overall structure to enhance bonding by solid state diffusion between the component parts of the structure. While the HV/LP plasma spray process itself produces excellent bonds, the subsequent heat treating and bonding is desirable to further enhance the integrity of the overall structure.

After the plasma spraying, HIP bonding, and machining, the composite hardware is protected by means of a corrosion-resistant alloy, which may either be clad using conventional techniques, or plasma sprayed in accordance with the process to which a related commonly-assigned U.S. patent application Ser. No. 246,119, filed Mar. 20, 1981, by Schilke et al. and entitled "APPLYING PROTECTIVE OUTER LAYER TO GAS TURBINE WATER-COOLED COMPOSITE NOZZLE AND BUCKET HARDWARE EMPLOYING PLASMA SPRAY PROCESS" is directed.

The plasma arc spray process has been used for many years to apply coatings to a variety of substrates for such purposes as imparting wear resistance and corrosion resistance. However, conventional plasma spray processing usually is done in air using particle velocities of about 500 feet/second (152 meters/second). Coatings so applied are characterized by porosity (typically 5–25%), and high oxide content.

Further, plasma-casting to much greater thicknesses has been employed as a means to fabricate complex geometry refractory metal parts as is reported in an article by Mash and Brown, "Structure and Properties of Plasma-Cast Materials", *Metals Engineering Quarterly*, February 1964, pages 18–26. The process described by Mash and Brown involves plasma casting a single material (which may start out as a powder mixture) onto a mandrel which is subsequently removed. In contrast, in the method of the present invention, material is deposited onto a non-sacrificial substrate. Different materials are cast in layers to form a composite nozzle or bucket with internal water-cooling channels.

As is described in the Muehlberger U.S. Pat. No. 3,839,618, there has recently been developed a high velocity/low pressure (HV/LP) plasma arc spray process which overcomes many of the limitations of the earlier process. By plasma spraying at particle velocities of from 2000–3000 feet/second (609/914 meters/second) in an argon (or other inert gas) atmosphere at low pressure (30–60 Torr), highly dense (98–100%) nearly oxide-free coatings can be deposited. The entire disclosure of the Muelberger U.S. Pat. No. 3,839,618 is hereby expressly incorporated by reference for its disclosure of details of HV/LP plasma spray processes.

While, as just indicated, the HV/LP plasma spray process is known, it is believed that the HV/LP process has not been used previously to deposit relatively thick (greater than 80 mils or 2.03 mm) layers of copper-based alloys for applications such as are described in this disclosure. In particular, there are a number of differences in the present application of the HV/LP process compared to previous applications of plasma spraying processes. The plasma sprayed copper material of the present fabrication process in high strength copper alloy which is used to reduce thermal gradients in the fabricated part (bucket or nozzle). Therefore, the copper layer must be very thick to provide sufficient reduction of thermal gradients. The plasma sprayed copper material bonds to cooling tubes (iron, Cobalt or nickel base) and a structural spar (iron, Cobalt or nickel base), which are not necessarily the same composition. It is an important performance characteristic that the copper material conduct heat from the surface of the nozzle or bucket to the water cooling tubes, and further, have a high density and low oxide/nitride content to maintain high thermal conductivity and to provide adequate low cycle fatigue life for the life of the part. The plasma sprayed layer must bond to an irregularly shaped surface, and must have clean bonds to the cooling tubes and spar.

Briefly stated, and in accordance with a more particular aspect of the invention, a method for the fabrication of water-cooled composite nozzle and bucket hardware for a gas turbine comprises the steps of providing a structural framework in the form of a spar; applying an initial dense, non-porous coating of higher thermal conductivity copper alloy to the structural framework by means of low pressure plasma arc spraying; placing tubes for coolant along the surface of the initial coating, then applying a dense, non-porous coating of high thermal conductivity copper alloy to the structural framework by means of low pressure plasma arc spraying in thickness at least sufficient to cover the coolant tubes and to allow excess for smooth machining.

The fabrication method of the invention includes a further step of hot isostatic pressure (HIP) bonding of the structural framework, pressure differential during being maintained by the coatings of essentially non-porous, high thermal conductivity copper.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

DETAILED DESCRIPTION OF THE PREFERRED EMBODIMENTS

Figure 1:
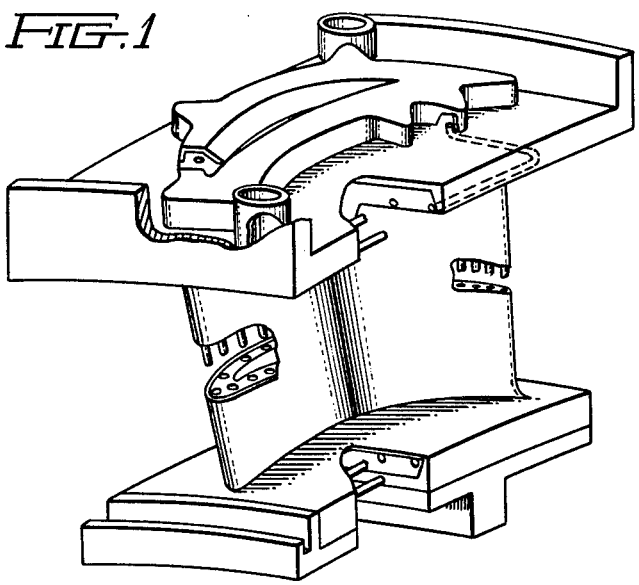
FIG. 1 is an isometric view of a gas turbine composite nozzle assembly.

Referring first to the drawings, typical nozzle (FIGS. 1 and 3) and bucket (FIG. 2) hardware structures are shown in accordance with the present invention. The structures of the nozzles and buckets are essentially the same insofar as the present invention is concerned. FIG. 1 is an overall isometric view, while FIGS. 2 and 3 are cross-sectional views.

Figure 2:
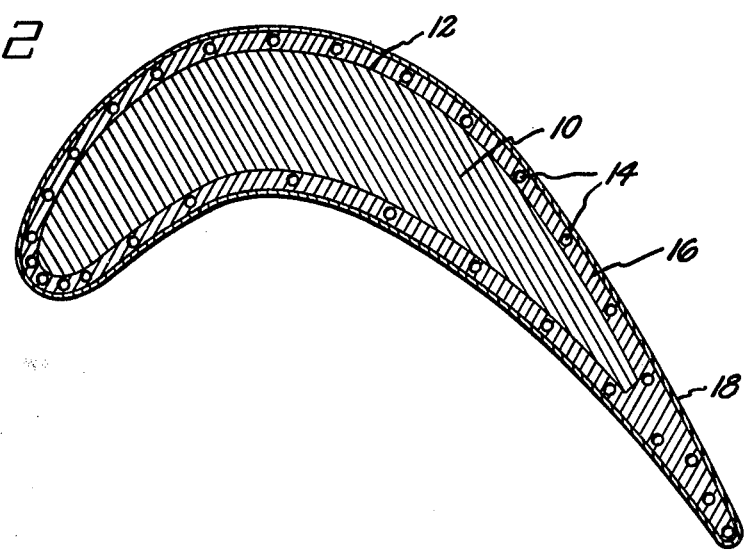
FIG. 2 is a cross-sectional view of a gas turbine bucket.
Figure 3:
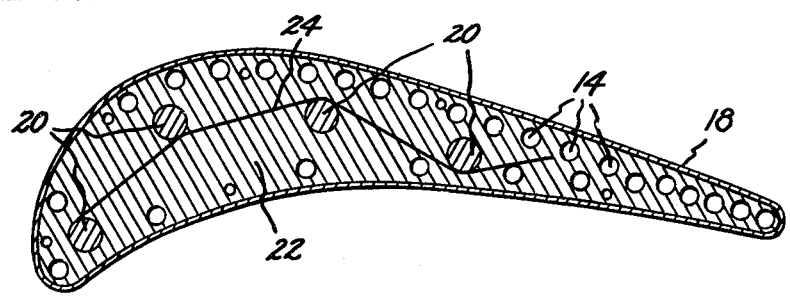
FIG. 3 is a cross-sectional view of a gas turbine nozzle showing an alternative form of spar.

In FIG. 2, a typical hardware assembly comprises a structural member in the form of a spar 10, formed of a nickel-based or cobalt-based super alloy, such as Inconel-718 (19 Cr, 19 Fe, 0.4 Al, 0.9 Ti, 3.0 Mo, 5.0 Cb, 0.04 C, balance Ni). To the spar 10 an initial dense, non-porous coating 12 of high thermal conductivity copper alloy is applied by means of low pressure plasma arc spraying. A suitable high velocity, low pressure (HV/LP) plasma spray system has been found to be one manufactured by Electro-Plasma, Inc. Irvine, Calif. This particular system incorporates an 80 kilowatt plasma gun, and normally operates at a pressure of 30–60 Torr.

Next, a plurality of coolant tubes 14 are placed along the surface of the initial coating 12, and held in place by means of a suitable jig, or by tacking near the ends. The coolant tubes 14 are approximately 0.1 inch in diameter, and comprise, for example, stainless steel or a nickel-based superalloy.

Next, a dense, non-porous coating 16 of high thermal conductivity copper alloy is applied to the structural framework by means of the same low pressure plasma arc spraying in thickness at least sufficient to cover the coolant tubes 14 and to allow excess for smooth machining.

While the plasma-sprayed copper coating 16 is well bonded to the underlying structure 10, to enhance bonding a bonding process known as hot isostatic pressing (HIP) is employed, which involves putting the pieces to be bonded in a closed retort vessel, pressurizing to approximately 10 to 15 ksi (ksi=thousands of pounds per square inch) (69 to 103 MN/m$^2$) with an inert gas such as argon, and heating to a temperature of approximately 1700°–1850° F. (926°–1010° C.) for 2–4 hours.

Next, the surface of the coating layer 16 is machined to desired smoothness and contour, and a suitable skin 18 of a corrosion-resistant alloy is applied, which may be either a conventional cladding, or a plasma sprayed layer in accordance with the process to which the above-identified commonly-assigned Schilke et al. application Ser. No. 246,119 is directed.

In FIG. 2, as has just been described, the underlying structural spar 10 is a rather large piece approximating the shape of the finished bucket.

In contrast, FIG. 3 illustrates an alternative wherein the basic structure comprised a plurality, in this case four, spar rods 20, and a major portion of the volume 22 surrounding the spar rods 20 comprises HV/LP plasma sprayed copper. Thus, extremely thick, up to one inch, sections of copper are sprayed about the structural framework defined by the spars.

To begin this particular process, a relatively thin web 24 of copper initially extends between the spar rods 20, and it is to this web 24, as well as the spar rods 20 themselves, to which the plasma sprayed copper initially bonds.

The coolant tubes 14 are placed in position at a suitable point in the spraying process, and eventually become completely embedded within the body 22 comprising plasma-sprayed copper.

SPECIFIC EXAMPLES

In feasibility studies, several copper alloys were plasma sprayed onto Inconel-718 (nickel base alloy) and Oxygen Free High Conductivity (OFHC) copper substrates of both rod and plate configuration. Evaluations of the results were then done, in particular, evaluation of the effects of plasma spray processing variables on the metallurgical characteristics of the copper layers deposited onto the nickel base and copper substrates.

TEST PROCEDURES

The substrates were OFHC Cu and Inconel-718 (19 Cr, 19 Fe, 0.4 Al, 0.9 Ti, 3.0 Mo, 5.0 Cb, 0.4 C, Balance Ni). The plasma spray coating alloys were MZC Cu (0.04 Mg, 0.15 Zr, 0.6 Cr, Balance Cu), obtained from Alloy Metals, Inc., Troy, Mich.; and CuNiTi powders obtained from Udimet Powder Division, Special Metals, Ann Arbor, Mich. Two different CuNiTi alloys were used: (5.0 Ni, 2.5 Ti, Balance Cu) and (2.0 Ni, 1.2 Ti, Balance Cu).

All of the powders were screened before use. Experiments were done using two powder fractions, −400 mesh (1.5 mils) (37 um) and +400, −325 mesh (+1.5 mils, −1.7 mils) (+37 um, −44 um) of each copper alloy.

These powders were used to deposit coatings approximately 50 mils (0.127 cm) thick onto OFHC Cu and Inconel 718 plates. All of the plasma spray depositions were made using a low pressure plasma spray system built by Electro-Plasma, Inc., Irvine, Calif.

The processing parameters used were: gun power 1300 amps at 50 volts; deposition pressure 60 Torr; powder-feed rate 13.2 lb/hr (6 kg/hr); and, gun-to substrate distance 13 inches (33 cm). The substrates were preheated using the hot gases from the gun to about 1292° F. (700° C.); during coating, the substrate temperature increased to about 1492° F. (800° C.) to 1652° F. (900° C.).

Metallographic examinations were made of each coating in the as-deposited and after-heat treatment conditions. The heat treatment used was 2 hrs. at 1746° F. (954° C.) in argon followed by 16 hrs. at 850° F. (454° C.) in Argon. Metallographic examination indicated that the coatings were dense and that good coating bonding was achieved on all specimens.

COATING DENSITY

Coating density measurements were made on MZC Cu deposited onto an anvil that had been used to support the substrates. These data are summarized in following TABLE I.

TABLE I
DENSITY OF PLASMA SPRAYED MZC Cu

| Powder (mesh size) | As Deposited | | Heat Treated (2 hr at 1746° F. (954° C.) + 16 hr at 850° F. (454° C.) in A) | |
|---|---|---|---|---|
| | 50 mil (1.27 mm) coating | 150 mil (3.81 mm) coating | 50 mil (1.27 mm) coating | 150 mil (3.81 mm) coating |
| −400 | 95.7% | 98.3% | 99.9% | 99.6% |
| −325, +400 | 95.8% | 99.0% | 97.0% | 99.7% |

From the foregoing TABLE I, it can be seen that, as deposited, the coarser powder coatings are as dense as those formed using the fine powder. Also, the thicker coating is generally denser than the thinner coating.

THERMAL CYCLING TEST

MZC Cu coated rods of Inconel 718 and OFHC Cu were evaluated in a simple laboratory screening test. The specimens were heated to 1746° F. (954° C.) in argon, then forced-air cooled. This cycle was repeated ten times. For the eleventh cycle, the specimens were plunged into room temperature water. These thermally-cycled specimens were carefully inspected macroscopically and microscopically; there was no evidence of cracking.

TENSILE TEST OF PLASMA SPRAYED CuNiTi ALLOYS

Plates of nearly fully dense CuNiTi alloys were prepared by spraying −400 mesh powders to build layers approximately 0.01 inch (0.25 cm) thick. After two-step solution plus aging heat treatment at 1940° F. (1060° C.) and 1148° F. (620° C.), sheet tensile specimens were machined from the plasma sprayed layers. Tensile strength data for the plasma-sprayed Cu-5Ni-2.5Ti are shown in the following TABLE II.

TABLE II
TENSILE PROPERTIES OF PLASMA SPRAYED Cu—5Ni—2.5Ti
(Heat Treated 1940° F. (1060° C.) + 1148° F. (620° C.)

| Test Temp | | UTS | | YS | | RA |
|---|---|---|---|---|---|---|
| °F. | (C.°) | ksi | (MN/m²) | ksi | (MN/m²) | % |
| RT | RT | 74.0 | 510 | 65.0 | 448 | 28 |
| 300° | 149° | 66.0 | 455 | 57.0 | 393 | 12 |
| 525° | 274° | 51.9 | 358 | 46.0 | 317 | 10 |
| 750° | 399° | 38.0 | 262 | 31.9 | 220 | 6 |
| 975° | 524° | 18.0 | 124 | 16.0 | 110 | 10 |

The tensile properties of the plasma sprayed Cu-5Ni-2.5Ti presented in the foregoing TABLE II are approximately the same as those for plasma sprayed Cu-2Ni-1.2 Ti, and about 30% to 50% less than those for wrought Cu-5Ni-2.5Ti.

BONDING TESTS

Bond strengths were measured for Cu-5 Ni-2.5Ti plasma spray deposited onto a cast Inconel 718 plate with a 45° step at the midpoint of the plate. After plasma spraying, blanks were ground from the composite with the 45° joint between Inconel 718 and the Cu alloy located at the midpoint. Sheet tensile specimens were machined and heat treated. Shear strengths of 28 ksi and 34.9 ksi (193 and 241 MN/m²) were measured after some plastic deformation had occurred. The shear stress at plastic yielding was 23.9 ksi (165 MN/m²) for both specimens. The corresponding tensile stresses in the specimens were 33.9 ksi (234 MN/m²) at yield and 39 and 50 ksi (269 and 345 MN/m²) at fracture.

These tests indicate that a very sound interface can be created by the plasma spray deposition process.

SUMMARY

From the foregoing, the LP/HV plasma spray process appears well suited to fabricating composite water-cooled nozzles and buckets for a high temperature gas turbine. It has been demonstrated that, with proper processing controls, high integrity layers of several copper-based alloys can be deposited onto OFHC copper and Inconel-718 nickel base substrates. These almost oxide-free coatings are nearly 100% dense and form a tenacious metallurgical bond with the substrate, particularly after a suitable heat treatment.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. A method for fabricating composite nozzle and bucket hardware for a gas turbine, comprising the steps of:

providing a structural framework in the form of a spar having tubes for coolant near the surface thereof; and applying a dense, non-porous coating of high thermal conductivity copper alloy to the structural framework by means of low pressure plasma arc spraying in a thickness of at least 50 mils (1.27 mm) so as to cover the coolant tubes and to allow excess coating for smooth machining.

2. A method according to claim 1, which comprises the further step of hot isostatic pressing (HIP) bonding of the structural framework, pressure differential being sustained by the coating of non-porous, high thermal conductivity copper.

3. A method according to claim 2, which comprises the further step of machining the coating of high thermal conductivity copper in order to achieve a smooth surface.

4. A method according to claim 1, wherein the copper coating is applied in a thickness between 50 mils (1.27 mm) and 150 mils (3.81 mm).

* * * * *